United States Patent
Yang et al.

(10) Patent No.: US 8,575,502 B2
(45) Date of Patent: Nov. 5, 2013

(54) PLUG INTERLOCK DEVICE FOR CIRCUIT BREAKER AND CIRCUIT BREAKER HAVING THE SAME

(75) Inventors: Hong Ik Yang, Chungcheongbuk-Do (KR); Kil Young Ahn, Daejeon (KR); Seung Pil Yang, Chungcheongbuk-Do (KR); In Kyum Kim, Chungcheongbuk-Do (KR); Yong Tae Kim, Chungcheongbuk-Do (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 425 days.

(21) Appl. No.: 12/972,350

(22) Filed: Dec. 17, 2010

(65) Prior Publication Data

US 2011/0155545 A1   Jun. 30, 2011

(30) Foreign Application Priority Data

Dec. 31, 2009   (KR) .......................... 10-2009-0136228

(51) Int. Cl.
*H01H 9/00* (2006.01)
*H02B 11/00* (2006.01)

(52) U.S. Cl.
USPC ..................................................... 200/50.21

(58) Field of Classification Search
USPC ............................................. 200/50.21–50.27
See application file for complete search history.

(56) References Cited

U.S. PATENT DOCUMENTS

| 5,206,468 A | 4/1993 | Kobayashi et al. |
| 2006/0118397 A1 | 6/2006 | Dahl et al. |
| 2011/0233034 A1* | 9/2011 | Park et al. .................. 200/50.27 |

FOREIGN PATENT DOCUMENTS

| JP | 59-182887 | 12/1984 |
| JP | 62-115710 | 7/1987 |
| JP | 4-056025 | 2/1992 |
| KR | 10-0364827 | * 12/2002 |

* cited by examiner

*Primary Examiner* — Renee Luebke
*Assistant Examiner* — Lheiren Mae Caroc
(74) *Attorney, Agent, or Firm* — Lee, Hong, Degerman, Kang & Waimey

(57) ABSTRACT

Disclosed are a plug interlock device for a circuit breaker and a circuit breaker having the same, wherein a plug is not allowed to be separated from a connector while a breaker main body is moved from a test position to a run position or is running at the run position, thereby obviating the plug from being unexpectedly unplugged from the connector while the breaker main body is moved from the test position to the run position or is running, resulting in preventing a safety accident in advance.

14 Claims, 6 Drawing Sheets

PLUG INTERLOCK DEVICE FOR CIRCUIT BREAKER AND CIRCUIT BREAKER HAVING THE SAME

CROSS-REFERENCE TO RELATED APPLICATION

Pursuant to 35 U.S.C. §119(a), this application claims the benefit of earlier filing date and right of priority to Korean Application No. 10-2009-0136228, filed on Dec. 31, 2009, the contents of which is incorporated by reference herein in its entirety.

BACKGROUND OF THE INVENTION

1. Field of the Invention

The present invention relates to a circuit breaker, and particularly, to a circuit breaker having a plug interlock device for preventing a plug from being separated from a connector when a circuit breaker main body is moved from a test position to a run position or the circuit breaker is running.

2. Background of the Invention

In general, circuit breakers may be classified into a stationary type and a pull-out type. The fixed type circuit breaker merely has a breaker main body secured at a position within an electric power distributing board. The pull-out type circuit breaker has an outer case called a cradle for facilitating maintenance and repair of the breaker main body, structure of which allows push-in and pull-out of the breaker main body.

The pull-out type circuit breaker is employed in a distributing board, by which various electric devices, including the circuit breaker, all disposed therein, are managed so as to drive or control a power station, a substation and the like and to drive a motor. Also, the circuit breaker has a run position and a test position. At the run position, a power source side terminal and a load side terminal of the circuit breaker are connected to those of the cradle to thereby supply a voltage and a current, while at the test position, those terminals of the circuit breaker are separated from the terminals of the cradle so that a switching operation of the breaker main body is merely tested.

Here, in order to send an electric signal to the circuit breaker at the run position or the test position of the breaker main body to render the circuit breaker turned on or off, a device for applying power source to the breaker main body is needed. To this end, a control circuit plug is installed in the distributing board and a control circuit connector is installed in the breaker main body such that the control circuit plug is connected thereto or separated therefrom. If the breaker main body is pushed in or pulled out in a separated state between the control circuit plug and the control circuit connector or if the control circuit plug is unplugged from the control circuit connector at the run position, the circuit breaker may not run even in an emergency, which may cause an occurrence of an unexpected accident. Therefore, when the breaker main body is pushed in or pulled out or present at the run position, the circuit breaker should be managed such that the control circuit plug cannot be unplugged from the control circuit connector to obviate the risk of accident.

SUMMARY OF THE INVENTION

However, the related art circuit breaker does not separately employ a plug interlock device, by which the control circuit plug is not unplugged from the control circuit connector when the breaker main body is moving from the test position to the run position or is running. Accordingly, if an operator unplugs the control circuit plug from the control circuit connector by mistake, other safety accidents may be caused.

Therefore, to address the problem of the related art, an object of the present invention is to provide a circuit breaker capable of obviating a safety accident by preventing the control circuit plug from being unplugged from the control circuit connector when the breaker main body is moving or running.

To achieve these and other advantages and in accordance with the purpose of the present invention, as embodied and broadly described herein, there is provided a plug interlock device for a circuit breaker including a control circuit plug disposed at a distributing board, a control circuit connector disposed at a breaker main body accommodated in the distributing board and detachable from the control circuit plug, and a locking unit disposed between the plug and the connector and configured to allow the plug and the connector to be kept connected to each other.

In one aspect of the detailed description, there is provided a circuit breaker including a distributing board having a control circuit plug, a breaker main body having a control circuit connector, the control circuit plug being connected to or separated from the control circuit connector, and having terminals for receiving voltage and current, a cradle installed at the distributing board and having terminals connected to or separated from the terminals of the breaker main body, a movable carriage slidably installed at the cradle with the breaker main body being loaded, a transfer unit disposed between the movable carriage and the cradle and configured to convey the movable carriage, a first locking unit disposed between the control circuit plug and the control circuit connector and configured to selectively restrict the plug from being separated from the connector, an interlock unit coupled to the first locking unit to cooperatively move in a direction of the plug being inserted, and a second locking unit coupled to the interlock unit to selectively restrict the operation of the transfer unit in cooperation with the movement of the interlock unit.

In one aspect of the detailed description, there is provided a circuit breaker including a control circuit plug disposed at a distributing board, a control circuit connector disposed at a breaker main body and connected to or separated from the plug, the breaker main body accommodated in the distributing board to be movable back and forth, a fixed plate secured with the breaker main body and configured to support the connector, plug brackets coupled to both sides of the fixed plate to be movable in a direction of the plug being inserted, first locking latches rotatably coupled to the plug brackets, respectively, and configured to lock the plug, at least one links coupled to the plug brackets to interlock with the plug brackets, and a second locking latch rotatably coupled to one of the links and configured to selectively restrict the movement of the breaker main body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5 to 7 are views showing states at the respective positions of the plug interlock device in accordance with the present invention, wherein FIG. 5 shows a preliminary stage, FIG. 6 shows a test position, and FIG. 7 shows a run position.

DETAILED DESCRIPTION OF THE INVENTION

Description will now be given in detail of a plug interlock device for a circuit breaker and a circuit breaker having the same in accordance with the exemplary embodiments, with reference to the accompanying drawings. For the sake of brief description with reference to the drawings, the same or equivalent components will be provided with the same reference numbers, and description thereof will not be repeated.

Figure 1:
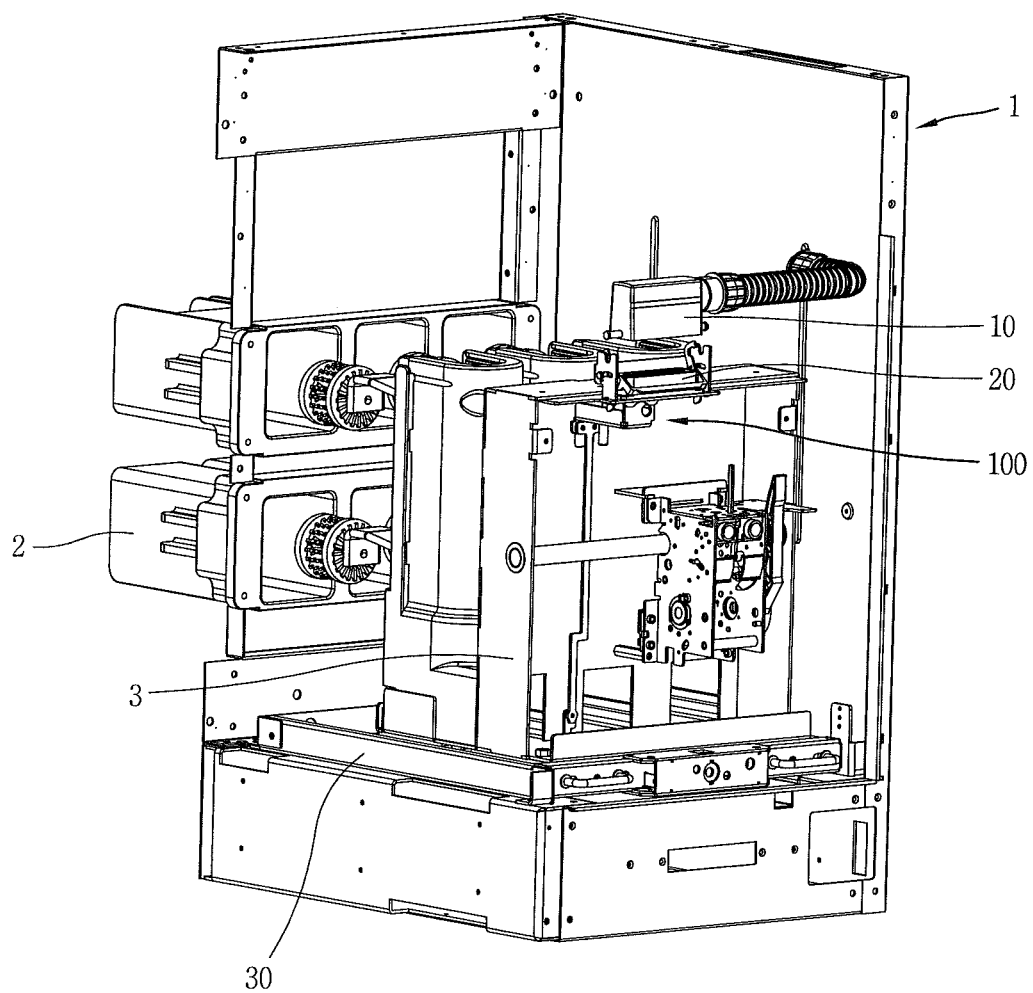
FIG. 1 is a perspective view showing a circuit breaker having a plug interlock device in accordance with the present invention.
Figure 2:
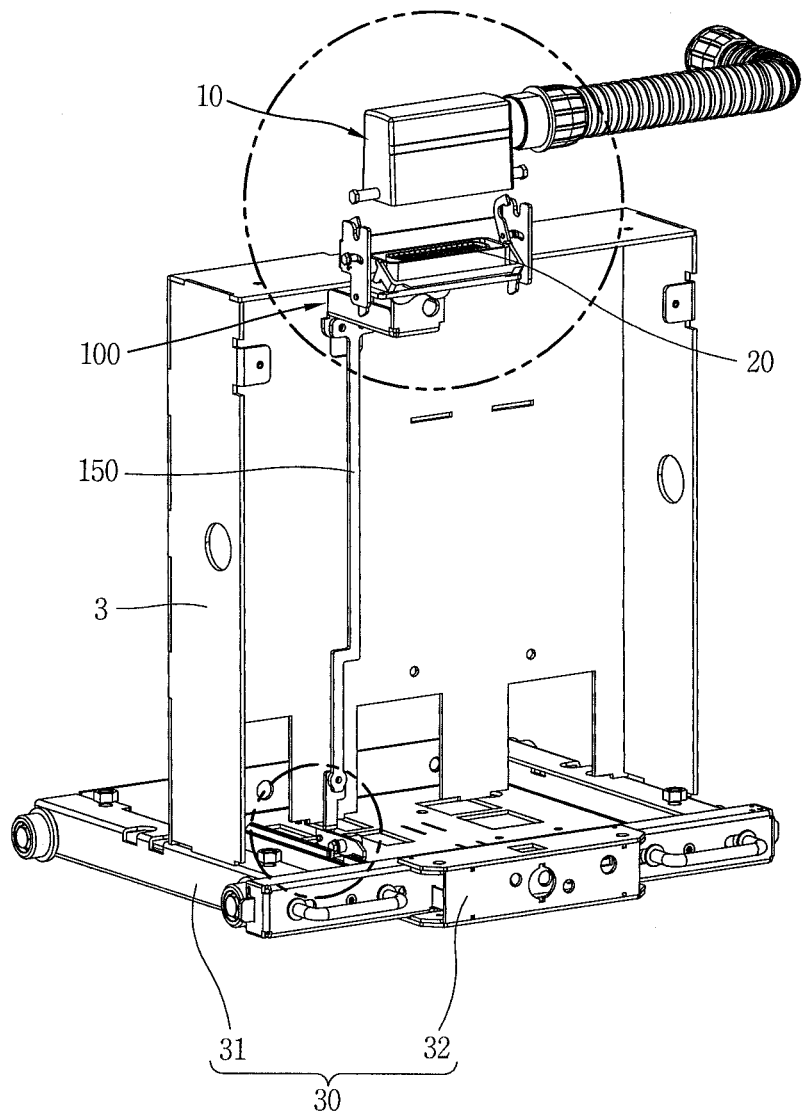
FIG. 2 is a perspective view of the plug interlock device shown in FIG. 1.
Figure 3:
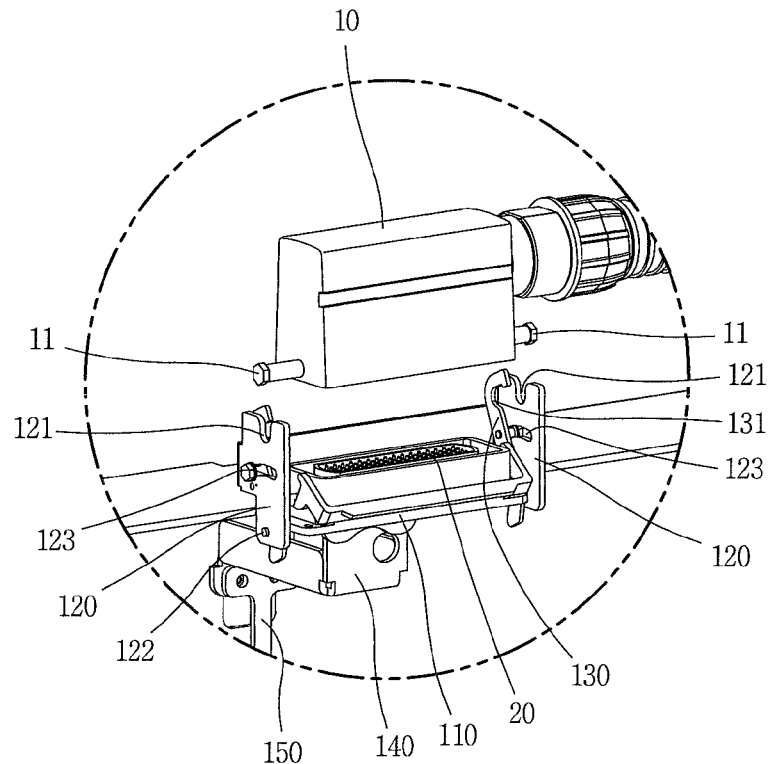
FIG. 3 is a perspective view showing a first locking unit of the plug interlock device shown in FIG. 2.
Figure 4:
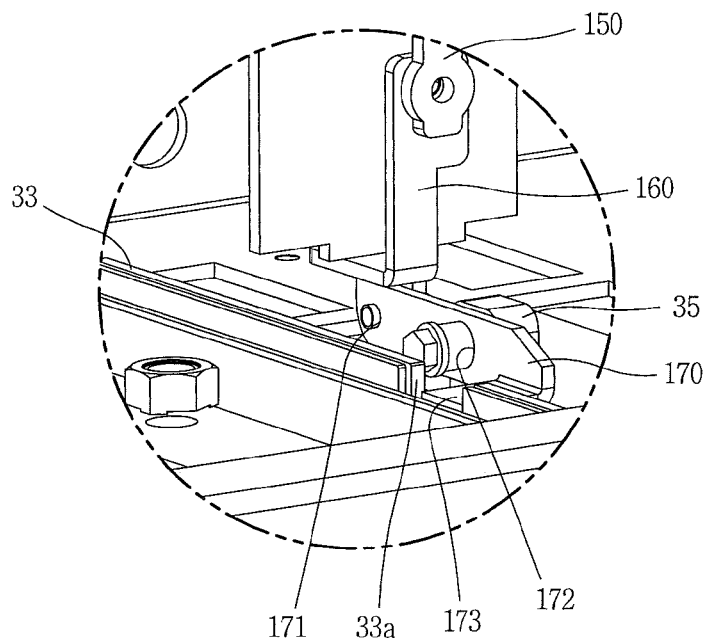
FIG. 4 is a perspective view showing a second locking unit of the plug interlock device shown in FIG. 2.

FIG. 1 is a perspective view showing a circuit breaker having a plug interlock device in accordance with the present invention, FIG. 2 is a perspective view of the plug interlock device shown in FIG. 1, FIG. 3 is a perspective view showing a first locking unit of the plug interlock device shown in FIG. 2, and FIG. 4 is a perspective view showing a second locking unit of the plug interlock device shown in FIG. 2.

As shown in FIG. 1, a circuit breaker having a plug interlock device in accordance with one exemplary embodiment may include an electric power distributing board 1, by which various electric devices all disposed therein are managed so as to drive or control a power station, a substation and the like and to drive a motor.

A cradle 2 having a power source side terminal and a load side terminal may be secured with the distributing board 1. A breaker main body 3, which has a power source side terminal and a load side terminal to be selectively connected to those of the cradle 2, respectively, may be detachably accommodated in the cradle 2 with being loaded on a movable carriage 30.

A control circuit plug (hereinafter, briefly referred to as 'plug') 10 may be installed at the distributing board 1 for supplying power to the circuit breaker. The plug 10 may transfer an electric signal to the circuit breaker at a test position and a run position of the circuit breaker such that the circuit breaker can be turned on or off. A control circuit connector (hereinafter, briefly referred to as 'connector') 20 selectively connected to the plug 10 may be installed at the breaker main body 3 of the circuit breaker.

A plug interlock device (hereinafter, briefly referred to as 'interlock device') 100, which allows for selective locking or unlocking between the plug 10 and the connector 20 when the plug 10 is connected to the connector 20, may be disposed between the breaker main body 3 and the movable carriage 4.

The interlock device 100, as shown in FIGS. 2 to 4, may include a fixed plate 110 secured with the breaker main body 3 for supporting the connector 20, plug brackets 120 coupled to both sides of the fixed plate 110 to be movable up and down, namely, in a direction of the plug 10 being inserted, first locking latches 130 rotatably coupled to the plug brackets 120 and having pins 11 provided at the plug 10 locked thereat, a connection link 140 coupled to the plug brackets 120 to be movable together, a sliding link 150 movable up and down by the connection link 140, a locking link 160 coupled to an end of the sliding link 150, and a second locking latch 170 rotatably coupled to an end of the locking link 160 and simultaneously rotatably coupled to a latch hinge protrusion 35 provided at the movable carriage 30 so as to selectively restrict a transfer rail 33 to be explained later by being inserted in a latch restricting groove 33a of the transfer rail 33.

The fixed plate 110 may be formed in a shape like a square plate such that the connector 20 may be secured with a central portion thereof. Both side surfaces of the fixed plate 110 may be shown having guide grooves (not shown), in which the first locking latches 130 can be slidably inserted so as to be rotated in a lengthwise direction. Here, although not shown, the guide grooves may be replaced with guide protrusions in a rib-like shape.

The plug brackets 120 may be disposed at both sides of the fixed plates 110 to be movable up and down with respect to the fixed plate 110. Pin grooves 121 may be formed at upper surfaces of the plug brackets 120, respectively, such that the pins 11 of the plug 10 can be inserted therein. Hinge holes 122, to which the first locking latches 130 are rotatably coupled, may be formed at lower portions of the plug brackets 120, respectively. The middle portion between the pin groove 121 and the hinge hole 122 is shown having a slit 123 for limiting a rotation angle of the corresponding first locking latch 130 so as for the first locking latch 130 to be rotatable within predetermined angular limits.

In regard of the structure of each of the first locking latches 130, an upper portion is formed as a locking portion 131 in a shape of a hook, a lower portion is rotatably coupled to the hinge hole 122 of the corresponding plug bracket 120, and a middle portion is slidably coupled to the slit 123 of the plug bracket 120.

The connection link 140 may be formed long in a horizontal direction such that it can come in contact with the plug brackets 120 so as to be moved down by being pressed when the plug brackets 120 are moved down. The sliding link 150 may be formed long in a longitudinal direction such that its upper end is coupled to the connection link 140 and its lower end is coupled to the locking link 160. The locking link 160 may be bent in a surface direction such that its upper end is coupled to the sliding link 150 and its lower end is rotatably coupled to the second locking latch 170.

In regard of the structure of the second locking latch 170, one end portion is shown having a first hinge hole 171 rotatably coupled to the locking link 160, a middle portion is shown having a second hinge hole 172 rotatably coupled to the latch hinge protrusion 35, and another end is shown having a locking protrusion 173 bent from the another end so as to be inserted in the latch restricting groove 32a to be locked therein.

In the meantime, the movable carriage 30, as shown in FIGS. 1 and 2, may include a carriage main body 31, on which the breaker main body 3 is loaded, and a girder 32, by which the carriage main body 31 is slid to convey the breaker main body 3 to the test position and the run position. The transfer rail 33 for guiding the movement of the carriage main body 31 may be installed between the carriage main body 31 and the girder 32, and the latch restricting groove 33a, in which the second locking latch 170 is selectively locked, may be formed at the middle of the transfer rail 33. The latch restricting groove 33a may alternatively be formed anywhere of the carriage main body 31 instead of the middle of the transfer rail 33.

The circuit breaker having the configuration will have the following operational effects.

Figure 5:
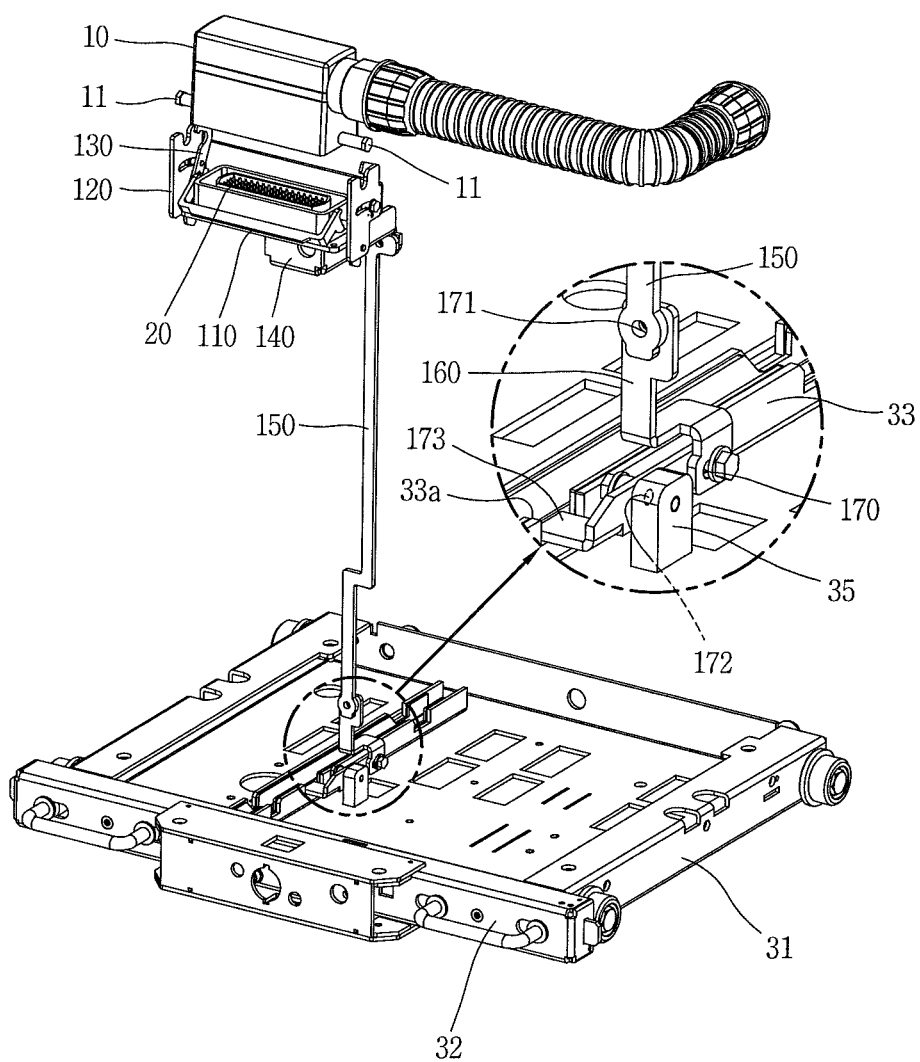
Figure 6:
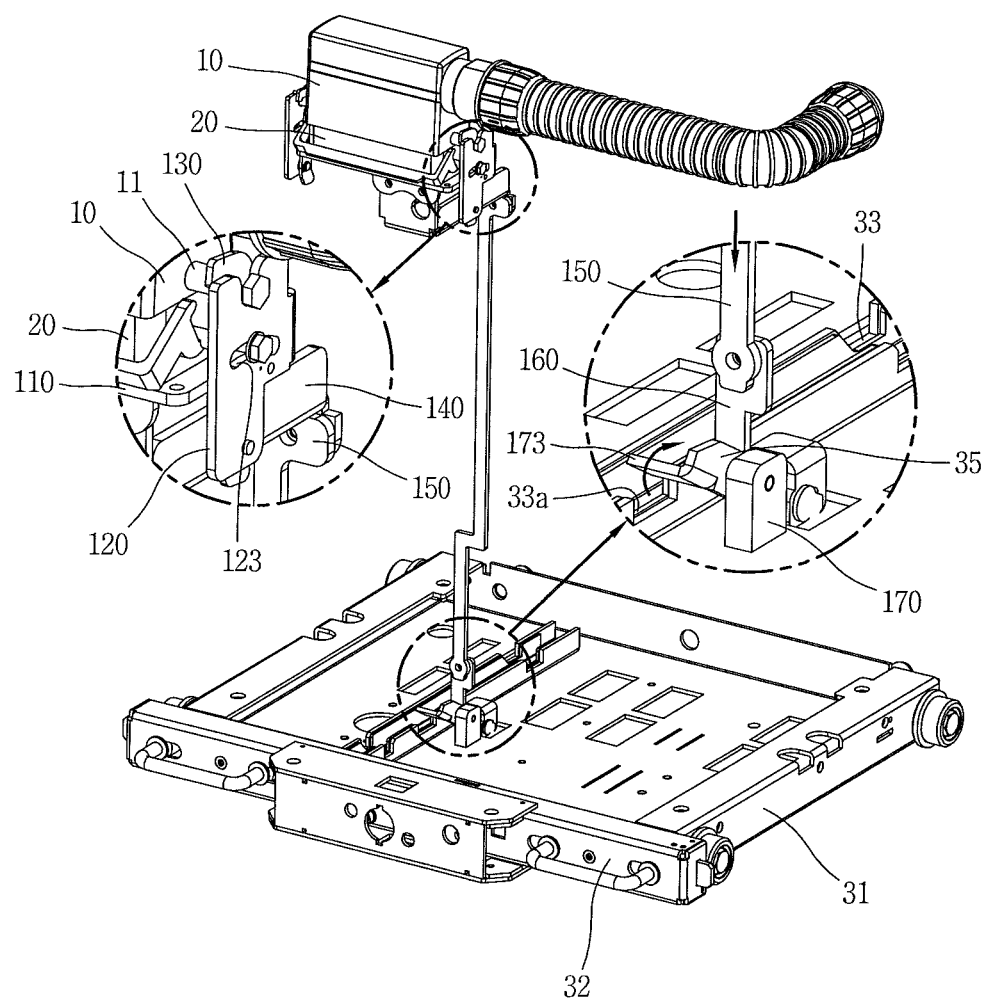

First, as shown in FIGS. 5 and 6, in a state of the breaker main body 3 being pulled out of the cradle 2, an operator pushes the carriage main body 31 from the girder 32 toward the cradle 2 using a manipulation handle (not shown). The breaker main body 3 then reaches a test position, at which the plug 10 is inserted in the connector 20 of the breaker main body 3 for coupling. That is, in this state, the locking protrusion 173 of the second locking latch 170 rotates to be inserted in the latch restricting groove 33a of the transfer rail 33. Accordingly, the pin grooves 121 of the plug brackets 120 are open and thereby the operator may insert the plug 10 in the connector to be connected to each other. The plug brackets 120 are moved down by the force pressing the plug 10. In response, the connection link 120, the sliding link 150 and the locking link 160 are moved down as low as the plug brackets 120 being slid down. The second locking latch 170, which is coupled to the locking link 160 by a hinge, is then rotated based on the second hinge hole 172 such that the locking protrusion 173 is unlocked from the latch restricting groove 33a. The restricted carriage main body 31 is thereby released to be moved toward the cradle 2. Here, as the first locking latch 130 is moved down in cooperation with the plug brackets 120, it is rotated in a direction to lock the pins 11 of the plug 10 by virtue of the guide groove (not shown) of the fixed plate 110, thereby preventing the plug 10 from being separated from the connector 20.

Figure 7:
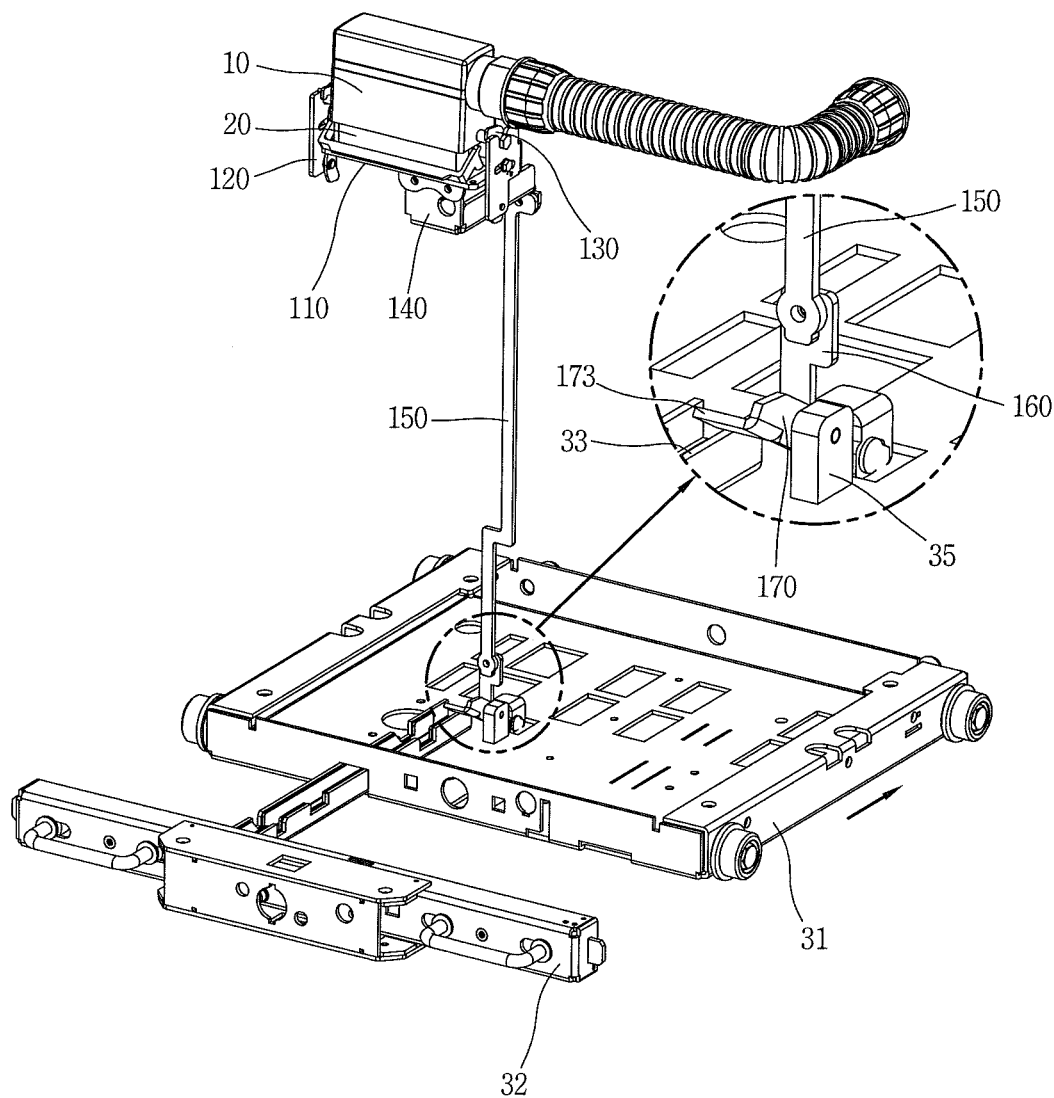

Referring to FIG. 7, when the operator moves the breaker main body 3 to the run position using the manipulation handle, the first locking latches 130 lock the pins 11 of the plug 10, and thereby the plug 10 cannot be separated from the connector 20 while the breaker main body 3 is moved to the run position. That is, at the test position of the breaker main body 3, the locking protrusion 173 of the second locking latch 170 can be inserted into the latch restricting groove 33a, so the first locking latches 130 open the pin grooves 121 of the plug brackets 120. However, if the breaker main body 3 is moved away from the test position, the second locking latch 170 is locked at the upper surface of the transfer rail 33 so as to be unrotatable. Accordingly, the plug brackets 120 remain in the state of being moved down due to the connection link 140, the sliding link 150 and the locking link 160. Consequently, the first locking latches 130 keep locking the pins 11 of the plug 10.

Such states are maintained not only while the breaker main body 3 is running but also while the breaker main body 3 is moved from the run position to the test position.

Thus, while the breaker main body is moved from the test position to the run position or is running at the run position, the plug is not allowed to be separated from the connector, thereby preventing the control circuit plug from unexpectedly being unplugged from the control circuit connector while the breaker main body is moved from the test position to the run position or while it is running, resulting in obviating safety accident.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A circuit breaker comprising:
   a distributing board having a control circuit plug;
   a breaker main body having a control circuit connector, the control circuit plug being connected to or separated from the control circuit connector, and having terminals for receiving voltage and current;
   a cradle installed at the distributing board and having terminals connected to or separated from the terminals of the breaker main body;
   a movable carriage slidably installed at the cradle with the breaker main body being loaded;
   a transfer unit disposed between the movable carriage and the cradle and configured to convey the movable carriage;
   a first locking unit disposed between the control circuit plug and the control circuit connector and configured to selectively restrict the plug from being separated from the connector;
   an interlock unit coupled to the first locking unit to cooperatively move in a direction of the plug being inserted; and
   a second locking unit coupled to the interlock unit to selectively restrict the operation of the transfer unit in cooperation with the movement of the interlock unit.

2. The circuit breaker of claim 1, wherein the first locking unit comprises:
   a plurality of plug brackets coupled to both sides of the connector to be movable in a direction of the plug being inserted; and
   a plurality of first locking latches rotatably coupled to the plug brackets, respectively, such that the plug is locked therein when the plug is coupled to the connector.

3. The circuit breaker of claim 2, wherein each of the plug brackets comprises a hinge hole to which the first locking latch is rotatably coupled, and a slit formed at one side of the hinge hole in an arcuate shape, the first locking latch being slidably coupled to the slit so as to be rotatable based upon the hinge hole.

4. The circuit breaker of claim 3, wherein pins are formed at both side surfaces of the plug, the pins being locked at the first locking latches, respectively.

5. The circuit breaker of claim 4, wherein pin grooves are formed at upper surfaces of the plug brackets, respectively, wherein the pins of the plug are inserted in the pin grooves when the plug is coupled to the connector.

6. The circuit breaker of claim 2, wherein the interlock unit comprises a plurality of links disposed between the plug brackets and the second locking unit and configured to rotate the second locking unit with moving in the direction of the plug being inserted.

7. The circuit breaker of claim 6, wherein the second locking unit comprises a second locking latch rotatably coupled to a link, the link movable up and down in a direction of the plug being inserted or separated, and simultaneously rotatably coupled to the movable carriage, and a latch restricting groove disposed at the transfer unit and configured to selectively restrict the second locking latch according to a rotating direction of the second locking latch.

8. The circuit breaker of claim 7, wherein the second locking latch has one end portion with a first hinge hole to which one end of the interlock unit is rotatably coupled, a middle portion with a second hinge hole to which the transfer unit is rotatably coupled, and another end portion with a locking protrusion inserted in the latch restricting groove to be locked thereat.

9. The circuit breaker of claim 8, wherein the movable carriage comprises a carriage main body configured to load the breaker main body thereon and a girder configured to convey the carriage main body, and a transfer rail is disposed between the carriage main body and the girder to make the carriage main body relatively move with respect to the girder, the latch restricting groove being formed at the transfer rail.

10. A circuit breaker comprising:
    a control circuit plug disposed at a distributing board;
    a control circuit connector disposed at a breaker main body and connected to or separated from the plug, the breaker main body accommodated in the distributing board to be movable back and forth;
    a fixed plate secured with the breaker main body and configured to support the connector;
    plug brackets coupled to both sides of the fixed plate to be movable in a direction of the plug being inserted;
    first locking latches rotatably coupled to the plug brackets, respectively, and configured to lock the plug;
    at least one link coupled to the plug brackets to interlock with the plug brackets; and
    a second locking latch rotatably coupled to one of the at least one link and configured to selectively restrict the movement of the breaker main body.

11. The circuit breaker of claim 10, wherein each of the plug brackets comprises a hinge hole to which the first locking latch is rotatably coupled, and a slit formed at one side of the hinge hole in an arcuate shape, wherein the first locking latch is slidably coupled to the slit so as to be rotatable based upon the hinge hole.

12. The circuit breaker of claim 11, wherein pins are formed at both side surfaces of the plug, the pins being locked at the first locking latches, respectively.

13. The circuit breaker of claim 12, wherein pin grooves are formed at upper surfaces of the plug brackets, respectively, wherein the pins of the plug are inserted in the pin grooves when the plug is coupled to the connector.

14. The circuit breaker of claim 10, wherein the at least one link comprises a plurality of links, wherein the plurality of links comprise:
    a first link secured with the plug brackets;
    a second link secured with the first link to be movable up and down by interlocking with the first link; and
    a third link having one end coupled to an end of the second link and another end rotatably coupled to the second locking latch.

* * * * *